(12) United States Patent
Hladik et al.

(10) Patent No.: US 11,816,789 B2
(45) Date of Patent: *Nov. 14, 2023

(54) APPARATUSES, METHODS, AND COMPUTER PROGRAM PRODUCTS FOR SAFETY COMPLIANCE DETERMINATIONS

(71) Applicant: Honeywell International Inc., Charlotte, NC (US)

(72) Inventors: Jakub Hladik, Senica (SK); Martin Konecny, Troubsko (CZ); Neal Anthony Muggleton, Stevenage (GB); Jan Riha, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,331

(22) Filed: May 5, 2022

(65) Prior Publication Data

US 2022/0262066 A1    Aug. 18, 2022

Related U.S. Application Data

(63) Continuation of application No. 16/953,957, filed on Nov. 20, 2020, now Pat. No. 11,354,850.

(51) Int. Cl.
*G06T 17/20* (2006.01)
*A62B 18/02* (2006.01)
(Continued)

(52) U.S. Cl.
CPC ............ *G06T 15/205* (2013.01); *A62B 18/02* (2013.01); *G06N 3/08* (2013.01);
(Continued)

(58) Field of Classification Search
None
See application file for complete search history.

(56) References Cited

U.S. PATENT DOCUMENTS 11,354,850 B1   6/2022 Hladik et al.
2008/0272903 A1* 11/2008 Plasberg ................. F16P 3/144
340/532

(Continued)

FOREIGN PATENT DOCUMENTS

WO     2019/224659 A1   11/2019

OTHER PUBLICATIONS

Berger, Elliott H., "'Calibrating' the insertion depth of roll-down foam earplugs", Proceeding of Meeting on Acoustics (ICA 2013), Jun. 2-7, 2013, 10 pages, vol. 19, No. 040002, Acoustical Society of America, Montreal, Canada.

(Continued)

*Primary Examiner* — Joni Hsu
(74) *Attorney, Agent, or Firm* — Alston & Bird LLP

(57) ABSTRACT

Apparatuses, methods, and computer program products for safety compliance determinations are provided. An example method includes receiving three-dimensional (3D) image data indicative of a field of view of a 3D imager that includes a first user upon which to perform a compliance determination. The method further includes generating a fit parameter associated with a safety device of the first user within the field of view of the 3D imager based upon the 3D image data, the fit parameter indicative of an associated positioning of the safety device relative to the first user. The method also includes comparing the fit parameter with a compliance threshold associated with the safety device and generating an alert signal in an instance in which the fit parameter fails to satisfy the compliance threshold. In some instances, the method may supply the 3D image data to an artificial neural network to generate the fit parameter.

18 Claims, 6 Drawing Sheets

(51) Int. Cl.
*G06V 40/16* (2022.01)
*G06T 15/20* (2011.01)
*G06N 3/08* (2023.01)
*G06Q 10/0639* (2023.01)
*G06T 15/00* (2011.01)

(52) U.S. Cl.
CPC ..... *G06Q 10/06395* (2013.01); *G06T 15/005* (2013.01); *G06T 17/20* (2013.01); *G06V 40/165* (2022.01); *G06T 2207/30201* (2013.01)

(56) References Cited

U.S. PATENT DOCUMENTS

| | | | |
|---|---|---|---|
| 2014/0307076 | A1 | 10/2014 | Deutsch |
| 2018/0096537 | A1* | 4/2018 | Kornilov ................ G06V 20/20 |
| 2018/0311517 | A1* | 11/2018 | Patil ...................... A62B 18/02 |
| 2019/0294703 | A1* | 9/2019 | Bolin ....................... G06N 3/08 |
| 2020/0050836 | A1* | 2/2020 | Gugino .................. G06T 17/00 |
| 2020/0074662 | A1* | 3/2020 | Williams ................. G06T 7/60 |
| 2021/0142465 | A1* | 5/2021 | Donoghue ............ G06T 7/0002 |

OTHER PUBLICATIONS

Extended European Search Report dated Apr. 20, 2022 for EP Application No. 21209063, 9 pages.
Honeywell International Inc., "Howard Leight, VeriPRO Fit-Testing System", [Brochure], Rev. 2.0, copyright Jan. 2017, [retreived from the Internet on Feb. 10, 2021], <URL:https://sps.honeywell.com/us/en/products/safety/hearing-protection/earplugs/veripro-fit-testing-system>, (8 pages).
Non-Final Office Action received for U.S. Appl. No. 16/953,957, dated Sep. 22, 2021, 15 pages.
Notice of Allowance and Fees Due (PTOL-85) dated Feb. 7, 2022 for U.S. Appl. No. 16/953,957.
Notice of Allowance received for U.S. Appl. No. 16/953,957, dated May 4, 2022, 2 pages.
Smalt, Christopher, et al., "Stand-off, Photograph-Based Estimation of Hearing Protection Attenuation and Fit", NHCA 44th Annual Conference, Feb. 20-22, 2020, Destin, Florida, (25 slides/5 pages).
Unknown, "PLY—Polygon File Format (Also known as the Stanford Triangle Format)", [article, online], [retreived from the Internet Feb. 10, 2021], <URL:http://paulbourke.net/dataformats/ply/#:~:text=The%20PLY%20format%20describes%20an,description%20of%20exactly%20one%20object>, (5 pages).

* cited by examiner

US 11,816,789 B2

APPARATUSES, METHODS, AND COMPUTER PROGRAM PRODUCTS FOR SAFETY COMPLIANCE DETERMINATIONS

CROSS REFERENCE TO RELATED APPLICATIONS

The present application is a continuation application of U.S. patent application Ser. No. 16/953,957, filed Nov. 20, 2020, now U.S. Pat. No. 11,354,850, which application is hereby incorporated by reference in its entirety.

TECHNOLOGICAL FIELD

Example embodiments of the present disclosure relate generally to safety systems and, more particularly, to the detection of the noncompliant use of safety devices.

BACKGROUND

In many environments, such as manufacturing facilities, production lines, and/or the like, workers (e.g., employees, contractors, staff, etc.) may be subject to various harmful conditions as part of performing their associated duties in these environments. Without the proper use of safety devices, often mandated by applicable industry regulations, these conditions may injury these workers. For example, some industries require that workers use ear plugs or other hearing protection to reduce or avoid ear damage associated with sufficiently loud work environments. The inventors have identified numerous deficiencies with these existing technologies in the field, the remedies for which are the subject of the embodiments described herein.

BRIEF SUMMARY

As noted above, many industries and environments are associated with various conditions that may be harmful to employees, contractors, staff, etc. that work in these environments. By way of example, some industrial environments may, as part of normal operation, produce sound that is damaging to a worker's ears and/or produce dust, suspended particulates, caustic chemicals, flying objects, and/or the like that are potentially damaging to a worker's eyes. As such, many industry regulations require that workers use safety devices such as ear plugs, safety glasses/goggles, or the like so as to reduce or eliminate the likelihood of this damage. In order to provide the necessary protection from these dangers, however, a user must properly fit (e.g., position, wear, etc.) the safety devices so that these devices may perform their intended function. For example, in order for an ear plug to appropriately shield an associated user's ears from harmful sound levels, the ear plugs must be properly fitted or positioned (e.g., at a sufficient depth in the user's ear canal). Given that these safety devices are positioned by an associated user, user error often results in a poor fit or improper positioning of these devices.

Traditional systems that attempt to review the use of safety devices by users have relied upon, in the case of ear plugs or related hearing protection, acoustic attenuation determinations. For example, these traditional systems may require that a particular user position (e.g., insert) a required safety device (e.g., hearing protection) and perform direct acoustical measurements in order to determine the noise reduction (e.g., attenuation) provided by the particular positioning of the safety device. Furthermore, traditional systems that attempt to review images of a user wearing safety devices to determine compliance rely upon two-dimensional (2D) data that lacks the ability to recognize or analyze the depth of items contained within the 2D data (e.g., lacks image data in a third dimension). As such, these systems may require a plurality of 2D images from different positions, angles, etc. relative to the user and further analysis of these 2D images in order to ascertain depth (e.g., data in the third dimension). Accordingly, such conventional techniques are time consuming to perform resulting in inefficient safety determinations, especially in high traffic environments (e.g., having a large number of workers subject to safety determinations).

To solve these issues and others, example implementations of embodiments of the present disclosure may leverage three-dimensional (3D) image data and machine learning techniques (e.g., artificial neural networks, convolutional neural networks, or the like) to, in near real-time, provide safety compliance determinations. In operation, embodiments of the present disclosure may generate fit parameters associated with safety devices of a user captured within a field of view of a 3D imager that is indicative of an associated positioning of the safety device(s) relative to this user. Generation of this fit parameter may include supplying 3D image data to an artificial neural network that compares numerical values (e.g., values associated with coordinates of vertices forming polygons within the field of view of the 3D imager) of the supplied 3D image data with 3D image data of the artificial neural network or convolutional neural network (e.g., the artificial neural network or convolutional neural network is trained on 3D image data). Comparison between the fit parameter and associated compliance thresholds for the specific safety device may be used to quickly and reliable determine proper fit or positioning of a safety device without the need for additional image data (e.g., a plurality of 2D image captures) or further testing (e.g. attenuation testing).

Apparatuses, methods, systems, devices, and associated computer program products are provided for safety compliance determinations. An example method for safety compliance determinations may include receiving three-dimensional (3D) image data, the 3D image data indicative of a field of view of a 3D imager that includes a first user upon which to perform a compliance determination. The method may further include generating a fit parameter associated with a safety device of the first user within the field of view of the 3D imager based upon the 3D image data, wherein the fit parameter is indicative of an associated positioning of the safety device relative to the first user. The method may also include comparing the fit parameter with a compliance threshold associated with the safety device and generating an alert signal in an instance in which the fit parameter fails to satisfy the compliance threshold.

In some embodiments, generating the alert signal may further include generating an adjustment notification including a modification of the positioning of the safety device relative to the first user.

In some embodiments, generating the alert signal may further include preventing access for the first user to one or more systems.

In some embodiments, determining the fit parameter may further include supplying the 3D image data to an artificial neural network.

In some embodiments, the 3D image data includes an N-dimensional matrix containing one or more values indicative of coordinates of vertices forming polygons within the field of view of the 3D imager including the first user. In such an embodiment, the method may further include reducing the N-dimensional matrix into a one-dimensional (1D) array and determining the fit parameter based upon a comparison between each value of the 1D array and one or more values associated with 3D image data indicative of the field of view of the 3D imager that includes a second user. In other embodiments, 3D image data that includes an N-dimensional matrix containing one or more values indicative of coordinates of vertices forming polygons within the field of view of the 3D imager may be supplied to a convolutional neural network that employs, for example, 3D kernels.

In some further embodiments, the method may include modifying the compliance threshold associated with the safety device based upon one or more iterative determinations of the fit parameter associated with the safety device.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
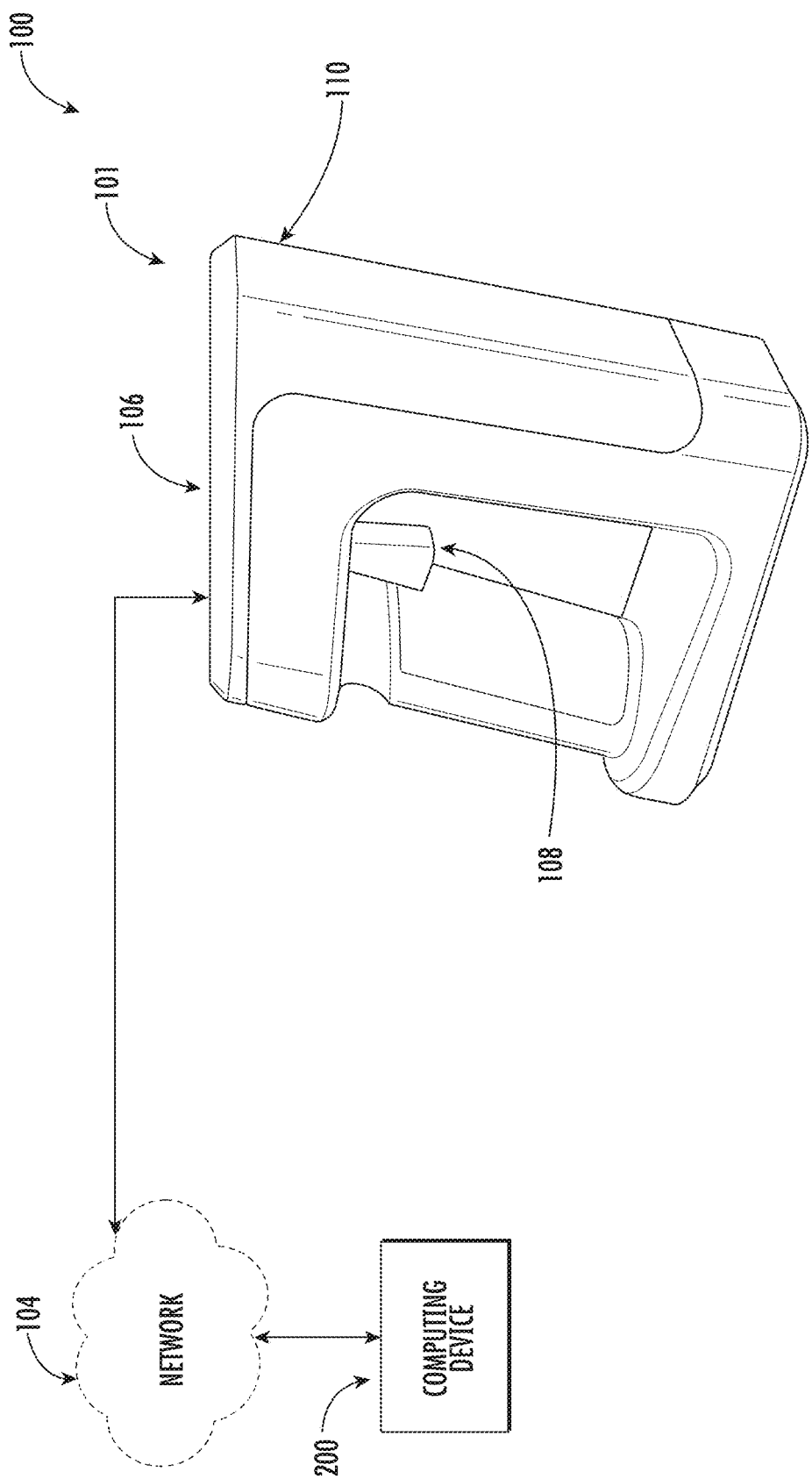
FIG. 1A illustrates an example safety compliance system and handheld 3D sensor device in accordance with some example embodiments described herein.

Some embodiments of the present disclosure will now be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout. As used herein, the description may refer to a computing device of an example safety compliance system as an example "apparatus." However, elements of the apparatus described herein may be equally applicable to the claimed method and computer program product. Thus, use of any such terms should not be taken to limit the spirit and scope of embodiments of the present disclosure.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As used here, the terms "three-dimensional imager" and "3D imager" refer to devices capable of generating 3D image data. Example 3D imagers may include 3D cameras, stereo cameras, depth cameras, time-of-flight (TOF) cameras or sensors, range cameras, and/or the like that may generate image data in three dimensions. Said differently, a 3D imager of the present disclosure may include any device configured to generate image data that includes an associated depth or is otherwise capable of determining or resolving a distance between the 3D imager and the subject for each point of the image captured by the 3D imager (e.g., represented by 3D image data).

As used herein, the term "computing device" refers to any user device, controller, object, or system which may be in network communication with a 3D imager (e.g., mobile or stationary) as described hereafter. For example, the computing device may refer to a wireless electronic device configured to perform various fit parameter related operations in response to 3D image data generated by the 3D imager. The computing device may be configured to communicate with the 3D imager via Bluetooth, NFC, Wi-Fi, 3G, 4G, 5G protocols, and the like. In some instances, the computing device may comprise the 3D imager (e.g., an integrated configuration).

As used herein, the term "computer-readable medium" refers to non-transitory storage hardware, non-transitory storage device or non-transitory computer system memory that may be accessed by a computing device, a microcomputing device, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Device Architecture and Example Apparatus

With reference to FIG. 1A, a safety compliance system 100 is illustrated with a handheld 3D sensor device 101 operably coupled with a computing device 200 via a network 104. The handheld 3D sensor device 101 may define a housing 106 that supports a 3D imager 110. The housing 106 may, in some embodiments as shown in FIG. 1A, be formed so as to be movable relative a first user (e.g., first user 116 in FIG. 1C). Although illustrated with a mobile, handheld housing 106, the present disclosure contemplates that the safety compliance system 100 may include any sensor device having any associated shape or form factor as described hereafter with reference to FIGS. 1B-1C. The handheld 3D sensor device 101 may, in some embodiments, further include an actionable element 108 (e.g., trigger mechanism or the like) configured to, in response to a user input, control operation of the 3D imager 110 in whole or in part. For example, the actionable element 108 may define a trigger mechanism or assembly that a user may actuate (e.g., compress the trigger) to cause the 3D imager 110 to generate 3D image data (e.g., cause the 3D imager 110 to capture a 3D image of the FOV of the 3D imager 110). Although illustrated with a trigger mechanism as the actionable element 108, the present disclosure contemplates that the actionable element 108 may include any feature (e.g., slider, button, etc.) configured to receive a user input.

As defined above, the 3D imager 110 may comprise a device capable of generating 3D image data and may include, for example, one or more 3D cameras, stereo cameras, depth cameras, time-of-flight (TOF) cameras or sensors, range cameras, and/or the like that may generate image data in three dimensions. The 3D imager 110 as shown may generate 3D image data (e.g., image data that includes an associated depth) of a field of view (FOV) associated with the 3D imager 110. By way of example, in operation, the handheld 3D sensor device 101 may be positioned proximate a first user such that the 3D imager 110 may generate 3D image data (e.g., capture a 3D image) of the first user within the FOV of the 3D imager 110. By way of a particular example, the handheld sensor device 101 may be positioned proximate the ear of a first user (e.g., first user 116 in FIG. 1C) such that the user's ear and an associated safety device (e.g., ear plug) are captured by the 3D imager 110 (e.g., as 3D image data).

Figure 1B:
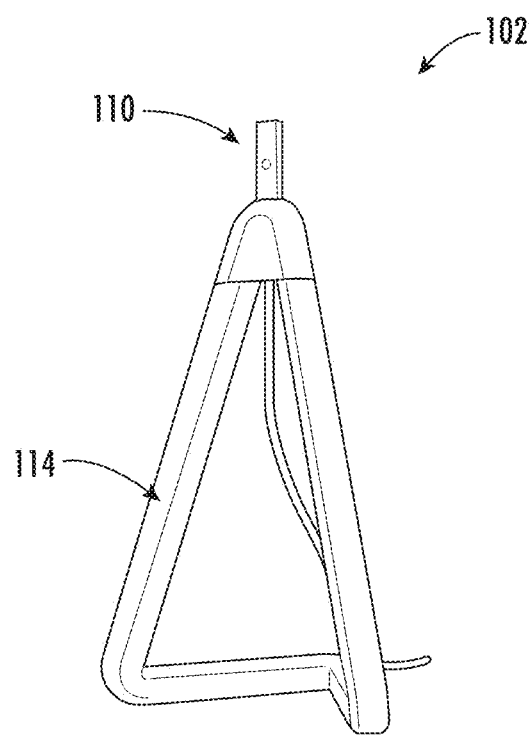
FIGS. 1B-1C illustrate example stationary 3D sensor devices for use with the safety compliance system of FIG. 1A, in accordance with some example embodiments described herein.
Figure 1C:
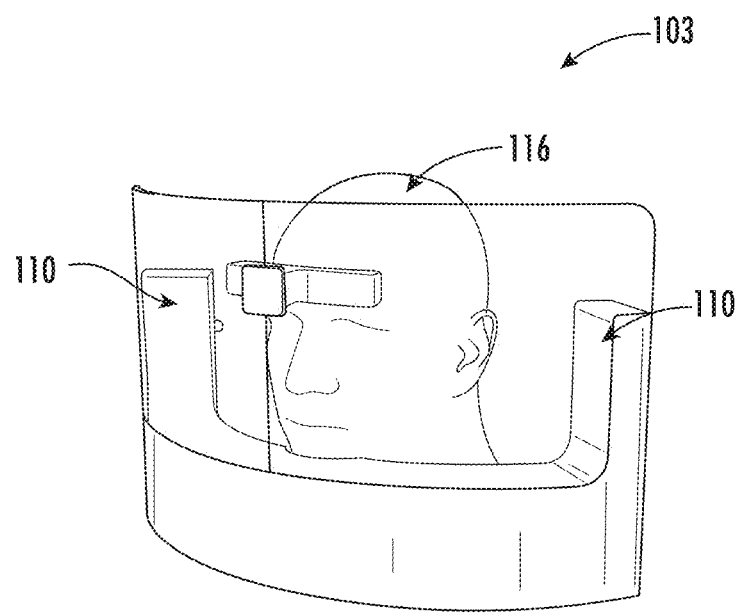

With reference to FIGS. 1B-1C, stationary sensor devices 102, 103 are illustrated for use as an alternative to or in addition to the handheld 3D sensor device 101 as part of the safety compliance system 100. In some embodiments the safety compliance system 100 may be formed as part of a building access management system so as to ensure safety compliance before providing access for a particular user to one or more systems associated with the safety compliance system 100. By way of example, handheld sensor device 101 and/or stationary sensor devices 102, 103 may be positioned at an entry or access point for a manufacturing facility so as to, as described hereafter, confirm a proper fit for safety devices before providing access to such a facility. As such, the stationary sensor device 102 may, for example, include a frame 114 configured to support the 3D imager 110. The frame 114 (e.g., stand, tri-pod, etc.) may be configured so as to position the 3D imager 110 proximate, for example, a first user's ear in order to generate 3D image data (e.g., captured 3D images) of the first user's ear and associated safety device (e.g., ear plug or other hearing protection). In some embodiments, as shown in FIG. 1C, the stationary sensor device 103 may be configured to receive a first user 116 such that one or more 3D imagers 110 may generate 3D image data that includes the first user 116. As shown, in some embodiments two (2) or more 3D imagers 110 may be used by the safety compliance system 100 so as to generate, simultaneously or otherwise, 3D image data associated with a plurality of FOVs associated with each 3D imager 110. For example, stationary sensor device 103 may be include two (2) 3D imagers 110 configured to simultaneously generate 3D image data of a first user's ears.

Turning back to FIG. 1A, the safety compliance system 100 may include a computing device 200 that is connected with one or more sensor devices (e.g., handheld sensor device 101 and/or stationary sensor devices 102, 103) over a network 104. As described hereafter, in some instances, the handheld sensor device 101 and/or stationary sensor devices 102, 103 may comprise the computing device 200, in whole or in part. The computing device 200 may include circuitry, networked processors, or the like configured to perform some or all of the apparatus-based (e.g., safety compliance-based) processes described herein, and may be any suitable processing device and/or network server. In this regard, the computing device 200 may be embodied by any of a variety of devices. For example, the computing device 200 may be configured to receive/transmit data (e.g., 3D image data) and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith.

In some embodiments, the computing device 200 may be located remotely from the handheld sensor device 101, the stationary sensor device 102, and/or the stationary sensor device 103, although in other embodiments, the computing device 200 may comprise the handheld sensor device 101, the stationary sensor device 102, and/or the stationary sensor device 103, in whole or in part. The computing device 200 may, in some embodiments, comprise several servers or computing devices performing interconnected and/or distributed functions. Despite the many arrangements contemplated herein, the computing device 200 is shown and described herein as a single computing device to avoid unnecessarily overcomplicating the disclosure.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols. Although illustrated in FIG. 1A with a network 104, the present disclosure contemplates that, in some embodiments, the computing device 200 may be formed as part of an example sensor device.

Figure 2:
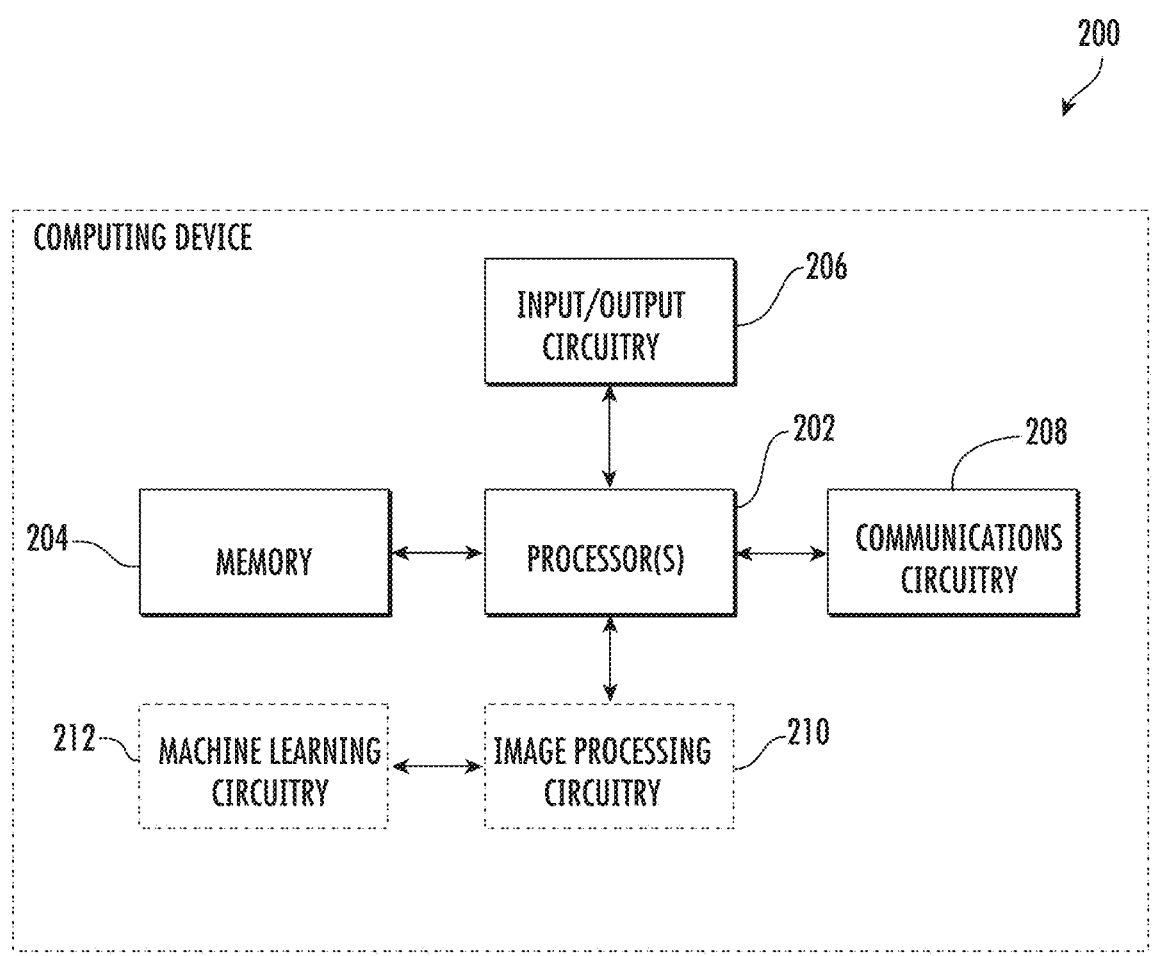
FIG. 2 illustrates a schematic block diagram of example circuitry that may perform various operations, in accordance with some example embodiments described herein.

As illustrated in FIG. 2, the computing device 200 may include a processor 202, a memory 204, input/output circuitry 206, and communications circuitry 208. Moreover, the computing device 200 may include image processing circuitry 210 and/or machine learning circuitry 212. The computing device 200 may be configured to execute the operations described below in connection with FIGS. 3-4. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the computing device 200 may be housed within the handheld sensor device 101 and/or the stationary sensor devices 102, 103. It will be understood in this regard that some of the components described in connection with the computing device 200 may be housed within one or more of the devices of FIGS. 1A-1C, while other components are housed within another of these devices, or by yet another device not expressly illustrated in FIGS. 1A-1C.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the computing device 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the computing device 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the computing device 200 to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the computing device, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

The computing device 200 further includes input/output circuitry 206 that may, in turn, be in communication with processor 202 to provide output to a user and to receive input from a user, user device, or another source. In this regard, the input/output circuitry 206 may comprise a display that may be manipulated by a mobile application. In some embodiments, the input/output circuitry 206 may also include additional functionality including a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the computing device 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the computing device 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Image processing circuitry 210 includes hardware components designed to generate a fit parameter associated with a safety device of the first user within the field of view of the 3D imager 110 based upon the 3D image data. Image processing circuitry 210 may utilize processing circuitry, such as the processor 202, to perform its corresponding operations, and may utilize memory 204 to store collected information. In some instances, the image processing circuitry 210 may further include machine learning circuitry 212 that includes hardware components designed to analyze an N-dimensional matrix containing one or more values indicative of coordinates of vertices forming polygons within the field of view of the 3D imager including the first user to generate the fit parameter. By way of example, machine learning circuitry 212 may comprise or leverage an artificial neural network or convolutional neural network trained on at least 3D image data of a second user (e.g., a plurality of other users). The machine learning circuitry 212 may also utilize processing circuitry, such as the processor 202, to perform its corresponding operations, and may utilize memory 204 to store collected information.

It should also be appreciated that, in some embodiments, the image processing circuitry 210 and/or the machine learning circuitry 212 may include a separate processor, specially configured field programmable gate array (FPGA), or application specific interface circuit (ASIC) to perform its corresponding functions.

In addition, computer program instructions and/or other type of code may be loaded onto a computer, processor or other programmable circuitry to produce a machine, such that the computer, processor other programmable circuitry that execute the code on the machine create the means for implementing the various functions, including those described in connection with the components of computing device 200.

As described above and as will be appreciated based on this disclosure, embodiments of the present disclosure may be configured as apparatuses, systems, methods, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Safety Compliance Determinations

Figure 3:
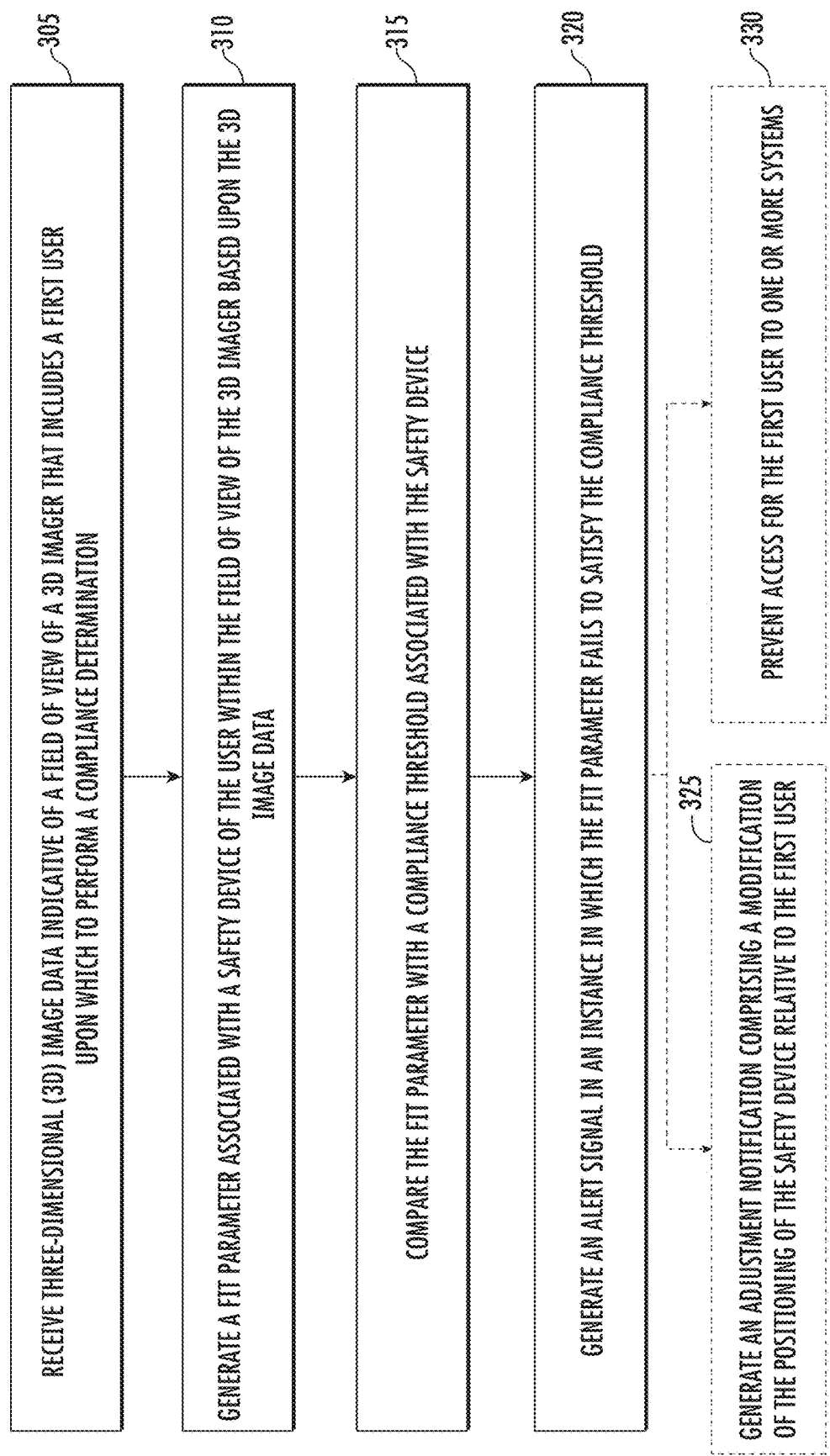
FIG. 3 illustrates an example flowchart for safety compliance determinations, in accordance with some example embodiments described herein.

FIG. 3 illustrates a flowchart containing a series of operations for safety compliance determinations. The operations illustrated in FIG. 3 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 305, the apparatus (e.g., computing device 200) includes means, such as processor 202, communications circuitry 208, image processing circuitry 210, or the like, for receiving three-dimensional (3D) image data indicative of a field of view (FOV) of a 3D imager 110 that includes a first user upon which to perform a compliance determination. As described above, the 3D imager 110 may be configured to capture the FOV of the 3D imager 110 as 3D image data that is a 3D representation (e.g., including a depth determination) of this FOV. By way of example, the first user may be positioned proximate the 3D imager 110 (e.g., stationary sensor devices 102, 103) and/or the 3D imager 110 may be positioned proximate the first user (e.g., handheld sensor device 101). In response to an instruction from an operator of the safety compliance system 100, via the actionable element 108, via an electronic communication from the computing device 200, or the like, the 3D imager 110 may generate 3D image data that captures a 3D image of the first user within the FOV of the 3D imager 110 (e.g., as 3D image data).

The 3D image data generated by the 3D imager 110 may, as described hereafter, include numerical values representative of the 3D coordinates of the vertices forming polygons within the field of view of the 3D imager 310. For example, the 3D image data generated by the 3D imager 110 may include numerical values of coordinates associated with the relative position of a particular vertex (e.g., x and y coordinates) within the FOV of the 3D imager 110. Due to the 3D nature of the 3D imager 110, however, the 3D image data may also include numerical values of coordinates associated with the relative distance (e.g., depth or z coordinate) between the 3D imager 110 and the subject (e.g., the objects within the FOV of the 3D imager 110). Each vertex within the field of view of the 3D imager 110 may include a plurality of said numerical values that may, in some embodiments, be contained within an N-dimensional matrix.

By way of a particular example, the 3D image data generated by the 3D imager 110 may be stored in a polygon file format (PLY) that describes an object as a collection of vertices, faces, and the like along with various properties (e.g., color, normal direction, etc.) attached to these elements. The 3D image data, stored as a PLY file, may contain the description of hand-digitized objects, polygon objects from modeling programs, range data, triangles from marching cubes (e.g., iso-surfaces from volume data), terrain data, radiosity models, and/or the like. Additionally, example properties that might be generated as 3D image data by the 3D imager 110 and stored with an example object as a PLY file may include color, surface normals, texture coordinates, transparency, range data confidence, and/or other properties for the front and/or the back of a polygon. As described herein, 3D image data (e.g., a PLY object) may include a list or N-dimensional matrix of x, y, and z coordinates for vertices and faces that are described by indices into the list or matrix of vertices. Said differently, vertices and faces are example elements, and the PLY file operates as a list of elements. Each element in a given PLY file may include a fixed number of properties as described above that are specified for each element.

In embodiments in which the computing device 200 and the 3D imager 110 are contained with a common device or integrated device (e.g., the computing device 200 comprises the 3D imager 110), the 3D image data may be received by the computing device 200 as described above. In other embodiments in which the computing device 200 is located separated from the 3D imager 110, such as connected via network 104, the computing device 200 may be configured to receive the 3D image data from the 3D imager 110 in response to generation of the 3D image data. Said differently, each instance of 3D image data generation may be transmitted to the computing device 200 upon generation. In other embodiments, the computing device 200 may periodically (e.g., according to a defined rate) request 3D image data from the 3D imager 110. In some embodiments, the 3D image data may be generated by the 3D imager 110 and/or transmitted to the computing device 200 in response to an action by the first user within the FOV of the 3D imager. By way of example, a first user (e.g., first user 116 in FIG. 1C) may attempt to enter a manufacturing facility that employs one or more features of the safety compliance system 100. The attempt to access such a facility (e.g., scanning of an identification badge, attempt to open an door, attempt to pass an access point, or the like) may cause the 3D imager 110 to capture a 3D image (e.g., generate 3D image data) that includes the first user within the FOV of the 3D imager. Furthermore, in some embodiments, the 3D imager 110 may continuously generate 3D image data, and, in response to an access attempt by the first user, the computing device 200 may transmit a request to the 3D imager 110 data for 3D image data that includes the first user.

As shown in operation 310, the apparatus (e.g., computing device 200) includes means, such as processor 202, image processing circuitry 210, machine learning circuitry 212 or the like, for generating a fit parameter associated with a safety device of the first user within the field of view of the 3D imager 110 based upon the 3D image data. As described hereafter, the fit parameter may be indicative of or based upon an associated positioning of the safety device relative to the first user. As described above, in some embodiments, a user may be required to wear a safety device that is designed for hearing protection, such as an ear plug that is inserted into the ear canal of the user, in order to work in loud environments. As such, the 3D image data generated at operation 305 that includes a first user may further include 3D image data (e.g., a captured 3D image) of a safety device (e.g., an ear plug) positioned relative to the first user. Said differently, the 3D image data may include numerical values associated with the coordinates of the vertices of polygons associated with the ear plug (e.g., hearing protection).

The fit parameter may be generated based upon this 3D image data and may be based upon the associated positioning of the safety device relative to the first user. By way of continued example, the fit parameter may be indicative of or based upon a relative insertion depth of the ear plug within the first user's ear canal. Said differently, a properly fitted or positioned ear plug may be sufficiently inserted (e.g., as compared to an associated threshold described hereafter) into the ear canal to reduce or prevent sound waves from entering the first user's ear. A poorly fitted or positioned ear plug may not be sufficiently inserted (e.g., as compared to an associated threshold described hereafter) into the ear canal to reduce or prevent sound waves from entering the first user's ear. As described hereafter with reference to FIG. 4, determination of the fit parameter may include supplying the 3D image data to an artificial neural network, convolutional neural network, or other machine learning system in order to analyze the 3D image data to identify the relative positioning of the safety device (e.g., ear plug) and output an associated confidence value (e.g., fit parameter). Although described herein with reference to an example artificial neural network, the present disclosure contemplates that any image processing, computer vision, and/or machine learning technique may be used based upon the intended application of the 3D imager 110 and safety compliance system 100.

As described above, the 3D image data may include an N-dimensional matrix containing numerical values indicative of coordinates of vertices forming polygons within the field of view of the 3D imager 110 including the first user. The artificial neural network utilized by the, for example, machine learning circuitry 212 may be trained upon a plurality of 3D image data generated by the 3D imager 110 (e.g., captured 3D images) that includes at least a second user. Although described herein with reference to a second user, the present disclosure contemplates that an example artificial neural network used by the safety compliance system 100 may be iteratively trained upon 3D image data that includes a plurality of users and associated safety devices at varying positions relative to the respective users. Said differently, such an artificial neural network may be trained upon sufficient 3D image data so as to ascertain the position of the first user's ear and the position of the safety device (e.g., ear plug) relative to the first user's ear (e.g., an inserted depth of ear plug within the first user's ear canal). By way of a particular example, the fit parameter may, in some embodiments, refer to a confidence of the computing device 200 (e.g., a confidence of the artificial neural network or convolutional neural network) that a safety device is properly positioned and may be based, at least in part, on a numerical distance (e.g., insertion distance) or numerical ratio of the inserted length of the ear plug relative to the total length of the ear plug. By way of example, the system may be 50% confident that the ear plug is properly positioned in a user's ear resulting in a fit parameter of 0.5 or 50%.

Thereafter, as shown in operation 315, the apparatus (e.g., computing device 200) includes means, such as processor 202, image processing circuitry 210, machine learning circuitry 212, or the like, for comparing the fit parameter with a compliance threshold associated with the safety device. In order to define the appropriate positioning of the safety device relative the first user, the computing device 200 may employ various compliance thresholds associated with respective safety devices. By way of example, a vision-related safety device (e.g., goggles, safety glasses, etc.) may be based upon or otherwise indicative of an associated compliance threshold relating to the positioning of the safety device relative the user's eye (e.g., a position that sufficiently shields the user's eyes). Similarly, a hearing-related safety device (e.g., ear plugs or the like) may be based upon or otherwise indicative of an associated compliance threshold related to the positioning of the ear plug relative the user's ear (e.g., a sufficient insertion distance so as to shield the user's ears). In some embodiments as described hereafter, each safety device may also include devices of varying sizes, shapes, type, etc. For example, ear plugs may vary in length, shape, cross-sectional area, material, and/or the like. As such, the present disclosure contemplates that the compliance thresholds and fit parameters described herein may be further configured for a safety device of a particular size, shape, type, etc. The compliance thresholds described herein may, in some embodiments, be set by applicable industry standards or regulations, set by a system administrator or set up procedure, or determined based upon iterative analysis of 3D image data by the artificial neural network.

With continued reference to operation 315, the compliance threshold associated with a hearing-related safety device such as an ear plug may, for example, define a minimum confidence value of 0.75 or 75%. In such an example, the fit parameter generated at operation 310 may be compared with the compliance threshold to determine if the fit parameter satisfies the compliance threshold. For example, if the fit parameter generated at operation 310 that is indicative of the system's confidence that the ear plug is properly inserted into a user's ear exceeds 90%, then the fit parameter satisfies the compliance threshold. In such an embodiment, the safety compliance system 100 may determine that the positioning of the safety device of the first user is satisfactory to reduce or prevent hearing damage and may, in some embodiments as described herein, allow access for the first user to one or more systems (e.g., access to a manufacturing facility or the like). Although described herein with reference to a compliance threshold of 0.75 or 75%, the present disclosure contemplates that the compliance threshold may define any associated confidence value or parameter based upon the intended application of the safety compliance system 100.

In an instance in which the fit parameter fails to satisfy the compliance threshold, as shown in operation 320, the apparatus (e.g., computing device 200) includes means, such as processor 202, communications circuitry 208, input/output circuitry 206, or the like, for generating an alert signal. The alert signal may be indicative of noncompliance of the first user with regard to the positioning of the safety device. In some embodiments, the alert signal may be displayed, for example by the input/output circuitry 206, for viewing by an operator, administrator, or other user of the safety compliance system 100. In some embodiments, the alert signal may be transmitted, for example by the communications circuitry 208, to a user device associated with the first user. In such an embodiment, the alert signal may operate to notify the user of potential safety concerns associated with the positioning of the first user's safety device(s).

In some embodiments, as shown in operation 325, the apparatus (e.g., computing device 200) includes means, such as processor 202, communications circuitry 208, or the like, for generating an adjustment notification comprising a modification of the positioning of the safety device relative to the first user. In such an embodiment, the alert signal generated at operation 320 may further include an adjustment notification for correcting the positioning issue associated with the safety device of the first user. By way of example, the fit parameter generated at operation 310 may fail to satisfy the compliance threshold at operation 315 in that the fit parameter is indicative of a failure of the safety device (e.g., ear plug) to be properly positioned (e.g., sufficiently inserted) relative the first user. As such, the adjustment notification generated at operation 325 may request a modification by the first user of the positioning of said safety device so as to increase the fit parameter (e.g., confidence value) such that the fit parameter satisfies the compliance threshold. By way of a particular example, in an instance in which the fit parameter is 0.50 or 50% and the compliance parameter is 0.60 or 60%, the adjustment notification may request a modification that directs the first user to further insert, for example, the exposed ear plug so as to modify the fit parameter in satisfaction of the example compliance parameter.

In some embodiments, as shown in operation 330, the apparatus (e.g., computing device 200) includes means, such as processor 202, communications circuitry 208, or the like, for preventing access for the first user to one or more systems. As described above, the computing device 200, 3D imager 110, or the like may be formed as part of a building access management system so as to ensure safety compliance before providing access for a particular user to one or more systems associated with these devices. By way of continued example, one or more devices of the safety compliance system 100 may be positioned at an entry or access point for a manufacturing facility so as to confirm a proper fit for safety devices before providing access to such a facility. As such, in an instance in which the fit parameter fails to satisfy the compliance threshold, the alert signal generated at operation 320 may further include instructions to one or more systems (e.g., access gate, door, turnstile, or the like) that prevents access (e.g., physical access, electronic access, etc.) for the first user to these systems. Said differently, the computing device 200 may be configured to, as described above, determine an improper or poor fit for a safety device (e.g., improper positioning of the safety device relative to the first user) such that the safety device fails to adequately protect the first user and may prevent the first user from accessing a location, system, etc. that may be harmful to the first user or otherwise requires proper safety device positioning. Although described herein with reference to system access, the present disclosure contemplates that the computing device 200 may modify any system parameter, feature, element (e.g., physical or electronic) in response to the determinations regarding safety compliance described herein.

Figure 4:
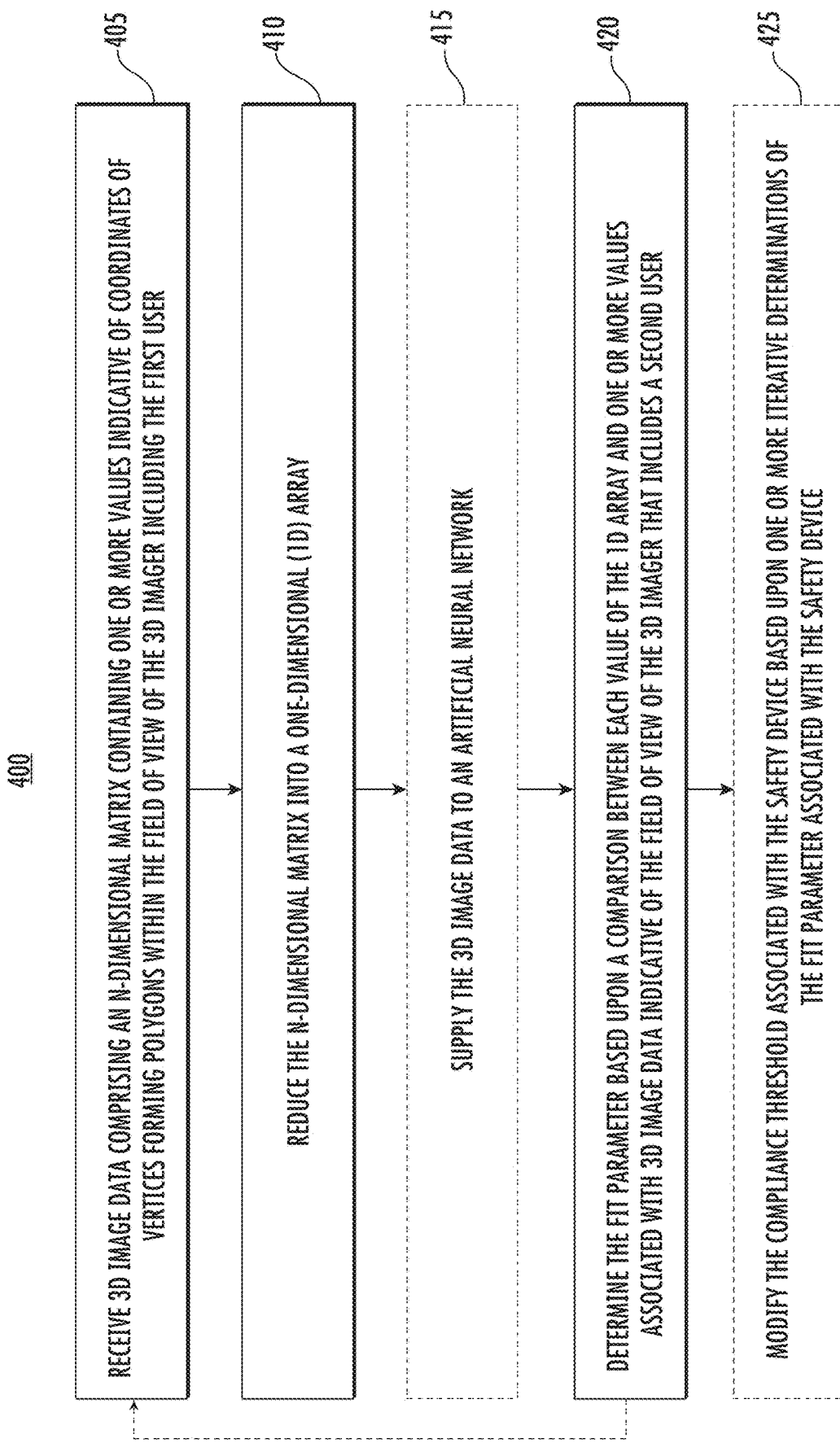
FIG. 4 illustrates an example flowchart for fit parameter generation, in accordance with some example embodiments described herein.

FIG. 4 illustrates a flowchart containing a series of operations for fit parameter generation. The operations illustrated in FIG. 4 may, for example, be performed by, with the assistance of, and/or under the control of an apparatus (e.g., computing device 200), as described above. In this regard, performance of the operations may invoke one or more of processor 202, memory 204, input/output circuitry 206, communications circuitry 208, image processing circuitry 210, and/or machine learning circuitry 212.

As shown in operation 405, the apparatus (e.g., computing device 200) includes means, such as processor 202, communications circuitry 208, image processing circuitry 210, or the like, for receiving 3D image data comprising an N-dimensional matrix containing one or more values indicative of coordinates of vertices forming polygons within the field of view of the 3D imager 110 including the first user. As described above, the 3D image data generated by the 3D imager 110 may include numerical values representative of the 3D coordinates of the vertices forming polygons within the field of view of the 3D imager 110. For example, the 3D image data generated by the 3D imager 110 may include numerical values of coordinates associated with the relative position of a particular vertex (e.g., x and y coordinates) within the FOV of the 3D imager 110. Due to the 3D nature of the 3D imager 110, however, the 3D image data may also include numerical values of coordinates associated with the relative distance (e.g., depth or z coordinate) between the 3D imager 110 and the subject (e.g., the objects within the FOV of the 3D imager 110). As shown below, example numerical values for the vertices forming polygons within the FOV of the 3D imager may include, for example, coordinates associated with a first vertex (e.g., $X_1$, $Y_1$, $Z_1$), coordinates associated with a second vertex (e.g., $X_2$, $Y_2$, $Z_2$), coordinates associated with a third vertex (e.g., $X_3$, $Y_3$, $Z_3$), . . . , coordinates associated with N number of vertices (e.g., $X_N$, $Y_N$, $Z_N$).

$$\begin{bmatrix} X_1 & Y_1 & Z_1 \\ X_2 & Y_2 & Z_2 \\ X_3 & Y_3 & Z_3 \\ \vdots & \vdots & \vdots \\ X_N & Y_N & Z_N \end{bmatrix}$$

As shown in operation 410, the apparatus (e.g., computing device 200) includes means, such as processor 202, image processing circuitry 210, machine learning circuitry 212, or the like, for reducing the N-dimensional matrix into a one-dimensional (1D) array. Given the volume of polygons and associated vertices of the 3D image data, the number of numerical values (e.g., coordinates) of the N-dimensional matrix of numerical values may be numerous in volume. In order to supply the numerical values of the 3D image data to an artificial neural network as described above and hereafter, the computing device 200 may reduce, compress, flatten, etc. the N-dimensional matrix of numerical values to a one-dimensional (1D) array that comprises the numerical values. As shown below, for example, coordinates associated with a first vertex (e.g., $X_1$, $Y_1$, $Z_1$), coordinates associated with a second vertex (e.g., $X_2$, $Y_2$, $Z_2$), coordinates associated with a third vertex (e.g., $X_3$, $Y_3$, $Z_3$), . . . , coordinates associated with N number of vertices (e.g., $X_N$, $Y_N$, $Z_N$) may be sequentially arranged in a 1D array or list.

$$[X_1 \ Y_1 \ Z_1 \ X_2 \ Y_2 \ Z_2 \ ... \ X_N \ Y_N \ Z_N]$$

In some embodiments, as shown in operation 415, the apparatus (e.g., computing device 200) includes means, such as processor 202, image processing circuitry 210, machine learning circuitry 212, or the like, for supplying the 3D image data to an artificial neural network. As described above, an artificial neural network utilized by the machine learning circuitry 212 may be trained upon a plurality of 3D image data generated by the 3D imager 110 (e.g., captured 3D images) that includes at least a second user (e.g., 3D images of a user other than the first user). In some instances, the artificial neural network may be supplied with a plurality of 3D image data of various captured 3D images of users and associated safety devices. The artificial neural network may be iteratively trained upon this plurality of 3D image data in order to determine commonalties, correlations, patterns, etc. between 3D image data so as to infer or otherwise determine the relative position of objects within the FOV of the 3D imager 110. By way of continued example, each instance of 3D image data generated by the 3D imager (e.g., each captured 3D image) may include an associated plurality of coordinates (e.g., numerical values for the x, y, and z positions of vertices forming polygons within the field of view of the 3D imager). Each of these numerical values may be captured in an N-dimensional matrix that is further reduced to a 1D array as described above with reference to operations 405 and 410. Although described herein with respect to an example second user, the present disclosure contemplates that the artificial neural network may be supplied with 3D image data associated with numerous users with varying types, shapes, configurations, positions, etc. of safety devices to further improve fit determinations by the artificial neural network.

During training of such an example artificial neural network iteratively supplied with a plurality of 3D image data, the artificial neural network may be configured to, over time, determined patterns amongst the plurality of numerical values contained within various 1D arrays. Said differently, the artificial neural network may be configured to determine a correlation or pattern associated with the numerical values at particular locations within the 1D array so as to determine associated locations of the user captured by the 3D image data. By way of a particular example, the artificial neural network may analyze numerous 1D arrays of 3D image data and identify that, for example, the numerical values at location $Z_3$ are within a range of numerical values in each 1D array. Such a determination or correlation may occur for each location within the array and may further include determined relationships between numerical values at different locations within the array (e.g., a ratio between adjacent or nearby values or the like). In doing so, the artificial neural network may process the 3D image data and determine positions within the 3D image data that are associated with particular locations of the user within the FOV of the 3D imager 110.

By way of a further example, the artificial neural network may determine the location of an ear of a user by determining a pattern of numerical values that, within a set range or boundary, are relatively unchanged (or substantially similar) amongst different instances of 3D image data. Said differently, the artificial neural network may determine that numerical values associated with a user's ear are relatively the same amongst different users (e.g., the positioning user's ear features are unchanged) but that numerical values associated with a safety device may be different amongst different users (e.g., depending upon inserted distance of the ear plug for example). As such, the artificial neural network may, for example, iteratively analyze numerical values associated with positions within the 1D array that are different amongst instances of 3D image data so as to determine numerical values associated with various relative positions of the safety device (e.g., ear plug) and the associated user (e.g., an inserted length or distance). In some instances, the 3D image data supplied to the artificial neural network may be augmented in that the 3D image captured by the 3D imager 110 may be, for example, rotated, flipped, etc. in order to further improve fit parameter generation.

Figure 5B:
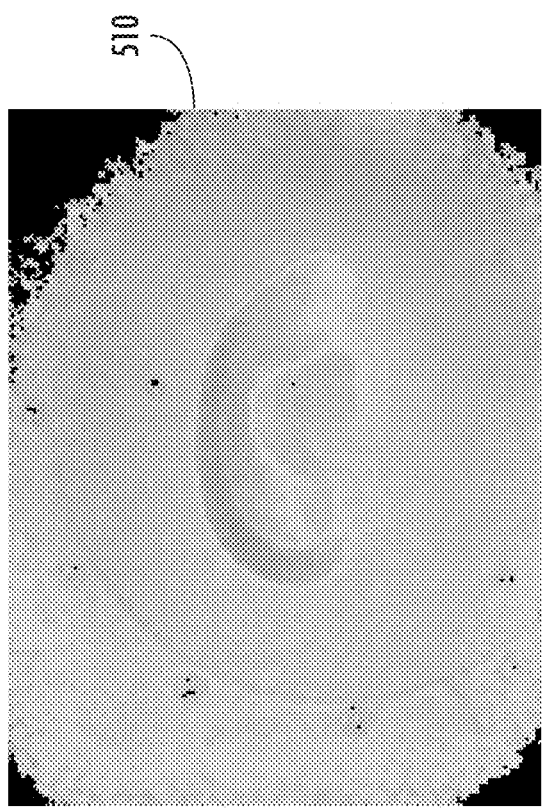
FIGS. 5A-5B illustrate example 3D image data associated with a poor fit and a proper fit, respectively, in accordance with some example embodiments described herein.
Figure 5A:
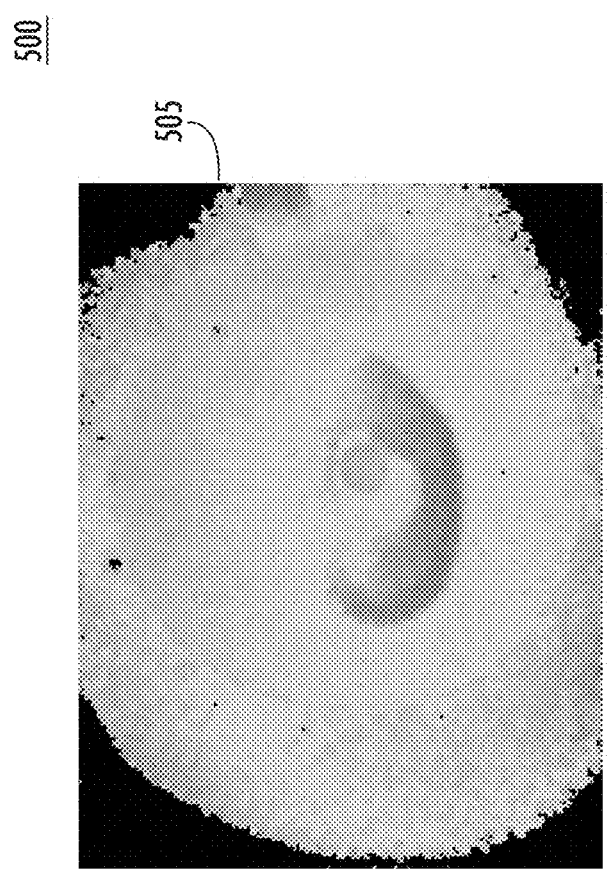

In some example artificial neural networks employed by the safety compliance system 100 and computing device 200, the network may include a plurality of multiple, dense, fully connected layers (e.g., each neuron is connected to all neurons from the previous layer as well as the subsequent layer) each of which may include multiple units and may include drop out layers. A rectified linear unit (ReLU) may be used as an activation function for each neuron in the artificial neural network. A last layer (e.g., another dense layer) with one (1) neuron and sigmoid activation function may also be used in that a sigmoid function may operate with data that may be classified into two (2) classes (e.g., a poor fit or proper fit as illustrated in FIGS. 5A-5B). Furthermore, the sigmoid function may be associated with a confidence parameter (e.g., a shift in the decision line) so as to ensure that only classifications are made that exceed the determined confidence. The confidence parameter may be set by a system administrator, applicable industry regulation, or the like and may, for example, be set as 80% (e.g., a shift in the sigmoid function by 0.80) in some embodiments.

Although described herein with reference to an artificial neural network at operation 415, the present disclosure contemplates that, in some embodiments, a convolutional neural network may be used. In such an example embodiment, the convolutional neural network may be configured to be trained on or otherwise process multidimensional inputs. Said differently, an example convolutional neural network may receive 3D image data at operation 405 and not require the reduction of the N-dimensional matrix into a one-dimensional array at operation 410. As described above, the convolutional neural network may include 3D kernels used for image processing to generate the fit parameter as described herein.

Thereafter, as shown in operation 420, the apparatus (e.g., computing device 200) includes means, such as processor 202, image processing circuitry 210, machine learning circuitry 212, or the like, for determining the fit parameter based upon a comparison between each value of the 1D array and one or more values associated with 3D image data indicative of the field of view of the 3D imager that includes a second user. As described above, the artificial neural network may be, for example, trained upon a plurality of 3D image data of other users (e.g., at least a second user). As such, the computing device 200 may be configured to determined numerical values (e.g., a range of numerical values, ratios between values, etc.) at particular positions within a 1D array that are associated with relative positions between the user (e.g., a user's ear) and the safety device (e.g., ear plug). At operation 420, the computing device 200 may compare each value of the 1D array (e.g. the 3D image data of the 3D image upon which to perform the compliance determination) with 3D image data (e.g., numerical values, value ranges, etc.) of the artificial neural network to identify patterns or correlations between these numerical values. By way of example, the comparison at operation 420 may indicate a similarity between numerical values of the 1D array and 3D image data associated with at least a second user (e.g., or a plurality of other users) that is indicative of a safety device (e.g., ear plug) that is improperly inserted into the user's ear canal. This comparison at operation 420 may iteratively occur between the 3D image data of the first user and each other instance of 3D image data or may occur between the 3D image data of the first user and a composite (e.g., a combined numerical representation) of a plurality of instances of 3D image data analyzed by the artificial neural network. Following such comparisons, the computing device may generate a fit parameter that is indicative of an associated positioning of the safety device relative to the first user and expressed as a value of the computing device's confidence in this determination (e.g., how confidence the system is that the safety device is properly positioned).

In some embodiments, as shown in operation 425, the apparatus (e.g., computing device 200) includes means, such as processor 202, image processing circuitry 210, machine learning circuitry 212, or the like, for modifying the compliance threshold associated with the safety device based upon one or more iterative determinations of the fit parameter associated with the safety device. By way of example, the iterative performance of the operations described herein in generation of a fit parameter including iterative analysis of 3D image data by an example artificial neural network may be used to improve subsequent safety compliance determinations. For example, iterative fit parameter generation and determinations may indicate, via an excess of noncompliant, poorly fitted, or improperly positioned safety devices, that the compliance threshold for a particular safety device is too high and should be modified (e.g., reduced). Similarly, iterative fit parameter generation and determinations may indicate, via an absence of noncompliant, poorly fitted, or improperly positioned safety devices, that the compliance threshold for a particular safety device is too low and should be modified (e.g., increased). In such an embodiment, the compliance threshold may also be iteratively modified during fit parameter generation in order to ensure accurate safety compliance determinations.

With reference to FIGS. 5A and 5B, example visual representations of 3D image data are illustrated. As shown in FIG. 5A, a noncompliant, poorly fitted, or improperly positioned safety device (e.g., ear plug) 505 is illustrated in which the safety device is not sufficiently inserted into the user's ear canal. In contrast, as shown in FIG. 5B, a compliant, properly fitted, and positioned safety device (e.g., ear plug) 510 is illustrated in which the safety device is sufficiently inserted into the user's ear canal. In some embodiments, such visual representations may be displayed to an operator or other user of the safety compliance system 100. In some embodiments, these visual representations may be color-coded to indicate a relative depth (e.g., z dimensions of the 3D image data) to an operator and may operate as further opportunities for visual inspection to ensure proper safety compliance. In doing so, the methods, systems, apparatuses, devices, and computer program products of the present disclosure may improve safety compliance determinations without the need for acoustic attenuation determinations and additional 2D image data captures as required by traditional systems. In doing so, embodiments of the present disclosure eliminate the time consuming operations of traditional systems by providing a solution that performs fit parameter generation and safety compliance determinations in near real-time.

FIGS. 3-4 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the computing device 200 and executed by a processor 202 of the computing device 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

What is claimed is:

1. A method for safety compliance determinations, the method comprising:
   receiving three-dimensional (3D) image data, the 3D image data indicative of a field of view of a 3D imager that includes a first user upon which to perform a compliance determination;
   determining a fit parameter associated with a safety device of the first user within the field of view of the 3D imager based upon the 3D image data, wherein the fit parameter is indicative of an associated positioning of the safety device relative to the first user;
   comparing the fit parameter with a compliance threshold associated with the safety device;
   generating an alert signal in an instance in which the fit parameter fails to satisfy the compliance threshold; and
   modifying the compliance threshold associated with the safety device based upon one or more iterative determinations of the fit parameter associated with the safety device.

2. The method according to claim 1, wherein generating the alert signal further comprises generating an adjustment notification comprising a modification of the positioning of the safety device relative to the first user.

3. The method according to claim 1, wherein generating the alert signal further comprises preventing access for the first user to one or more systems.

4. The method according to claim 1, wherein determining the fit parameter further comprises supplying the 3D image data to an artificial neural network.

5. The method according to claim 1, wherein the 3D image data comprises an N-dimensional matrix containing one or more values indicative of coordinates of vertices forming polygons within the field of view of the 3D imager including the first user.

6. The method according to claim 5, wherein determining the fit parameter further comprises:
   reducing the N-dimensional matrix into a one-dimensional (1D) array; and
   determining the fit parameter based upon a comparison between each value of the 1D array and one or more values associated with 3D image data indicative of the field of view of the 3D imager that includes a second user.

7. An apparatus for safety compliance determinations comprising:
   a three-dimensional (3D) imager configured to generate 3D image data indicative of a field of view of the 3D imager that includes a first user upon which to perform a compliance determination; and
   a computer device configured to:
      generate a fit parameter associated with a safety device of the first user within the field of view of the 3D imager based upon the 3D image data, wherein the fit parameter is indicative of an associated positioning of the safety device relative to the first user;
      compare the fit parameter with a compliance threshold associated with the safety device;
      generate an alert signal in an instance in which the fit parameter fails to satisfy the compliance threshold; and
      modify the compliance threshold associated with the safety device based upon one or more iterative determinations of the fit parameter associated with the safety device.

8. The apparatus according to claim 7, wherein the alert signal further comprises an adjustment notification comprising a modification of the positioning of the safety device relative to the first user.

9. The apparatus according to claim 7, wherein the alert signal further comprises instructions to prevent access for the first user to one or more systems.

10. The apparatus according to claim 7, wherein the computing device is further configured to determine the fit parameter by supplying the 3D image data to an artificial neural network.

11. The apparatus according to claim 7, wherein the 3D image data comprises an N-dimensional matrix containing one or more values indicative of coordinates of vertices forming polygons within the field of view of the 3D imager including the first user.

12. The apparatus according to claim 11, wherein the computing device is further configured to:
   reduce the N-dimensional matrix into a one-dimensional (1D) array; and
   determine the fit parameter based upon a comparison between each value of the 1D array and one or more values associated with 3D image data indicative of the field of view of the 3D imager that includes a second user.

13. A non-transitory computer-readable storage medium for using an apparatus for safety compliance determinations, the non-transitory computer-readable storage medium storing instructions that, when executed, cause the apparatus to:
   receive three-dimensional (3D) image data, the 3D image data indicative of a field of view of a 3D imager that includes a first user upon which to perform a compliance determination, generate a fit parameter associated with a safety device of the first user within the field of view of the 3D imager based upon the 3D image data, wherein the fit parameter is indicative of an associated positioning of the safety device relative to the first user,
   compare the fit parameter with a compliance threshold associated with the safety device;
   generate an alert signal in an instance in which the fit parameter fails to satisfy the compliance threshold; and
   modify the compliance threshold associated with the safety device based upon one or more iterative determinations of the fit parameter associated with the safety device.

14. The non-transitory computer-readable storage medium according to claim 13, wherein the non-transitory computer-readable storage medium stores instructions that, when executed, cause the apparatus to generate an adjustment notification comprising a modification of the positioning of the safety device relative to the first user.

15. The non-transitory computer-readable storage medium according to claim 13, wherein the non-transitory computer-readable storage medium stores instructions that, when executed, cause the apparatus to prevent access for the first user to one or more systems.

16. The non-transitory computer-readable storage medium according to claim 13, wherein the non-transitory computer-readable storage medium stores instructions that, when executed, cause the apparatus to supply the 3D image data to an artificial neural network.

17. The non-transitory computer-readable storage medium according to claim 13, wherein the 3D image data comprises an N-dimensional matrix containing one or more values indicative of coordinates of vertices forming polygons within the field of view of the 3D imager including the first user.

18. The non-transitory computer-readable storage medium according to claim 17, wherein the non-transitory computer-readable storage medium stores instructions that, when executed, cause the apparatus to:
- reduce the N-dimensional matrix into a one-dimensional (1D) array; and
- determine the fit parameter based upon a comparison between each value of the 1D array and one or more values associated with 3D image data indicative of the field of view of the 3D imager that includes a second user.

* * * * *